H. Carpenter,
Fruit Basket,

N° 83,459.    Patented Oct. 27, 1868.

Witnesses.                                    Inventor.
H. C. Ashkettle                               Henry Carpenter
Wm. A. Morgan.                                Munn & Co.
                                              Attorneys.

HENRY CARPENTER, OF BROOKLYN, E. D., NEW YORK.

Letters Patent No. 83,459, dated October 27, 1868; antedated October 17, 1868.

IMPROVED PEACH-BASKET

The Schedule referred to in these Letters Patent and making part of the same.

*To all whom it may concern:*

Be it known that I, HENRY CARPENTER, of Brooklyn, Kings county, New York, have invented a new and improved Peach-Basket; and I do hereby declare that the following is a full, clear, and exact description thereof, which will enable others skilled in the art to make and use the same, reference being had to the accompanying drawings, forming a part of this specification.

This invention consists in a novel manner of securing the bottom in the basket, whereby the bottom is somewhat raised, so that it cannot come in contact with the earth, or any support on which the basket is placed.

This result is attained by having a hoop firmly secured in the lower end of the basket for the bottom to rest upon, the latter being strengthened by a batten, and secured by wires on the hoop.

In the accompanying sheet of drawings—

Figure 1:
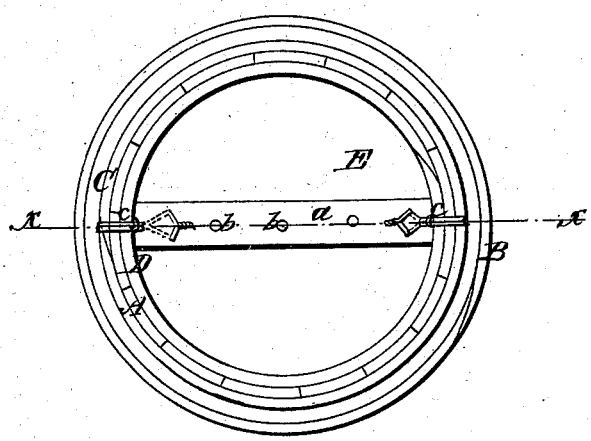

Figure 1 is an inverted plan of a peach-basket provided with my improvement.

Figure 2:
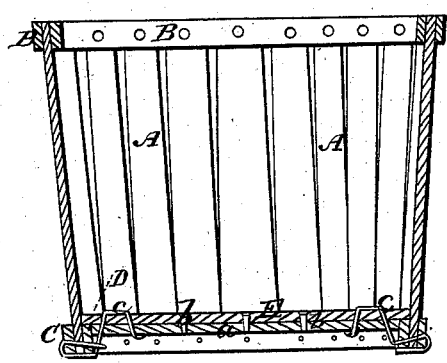

Figure 2, a vertical section of the same, taken in the line *x x*, fig. 1.

Similar letters of reference indicate corresponding parts.

A represents the splints which form the side of the basket; B B, the inner and outer top hoops; C, the exterior lower hoop, and D the inner lower hoop. All these hoops are firmly secured in position by nails, or otherwise.

E represents the bottom, which is made out of quite thin stuff, and is strengthened by a central batten, *a*, secured to its under side by screws or nails, *b*. This bottom, E, rests upon the hoop D, and the latter is notched to receive the ends of the batten *a*. The hoop D forms a firm support for the bottom, E, and in order to prevent the bottom being pushed upward within the basket, I secure it at each end of the batten *a* by a wire, *c*, which wires pass through holes in the two lower hoops C D, and through the splints A, which are in line with the holes in said hoops, and through holes made in the bottom and the batten.

By this improvement, the bottom of the basket is preserved from injury, not liable to be knocked into the basket, or broken, or split, by being let suddenly down when filled, as the bottom does not come in contact with the ground, or other surface on which it may be placed, and in case an empty basket is inverted and used as a seat, which is frequently done, the wires *c* prevent it from being driven or forced down within the basket.

I do not claim, broadly, a peach-basket provided with a raised or elevated bottom; but I do claim as new, and desire to secure by Letters Patent—

Securing the raised bottom of the peach-basket upon the inner hoop D by means of the central batten *a* let into said hoop at each end, beneath the bottom, and by the wires *c* and screws *b*, all arranged as described, whereby the bottom and batten are raised above the lower edge of the hoop D, and prevented from being knocked into the basket when the latter is inverted and used as a seat, as herein shown and described.

HENRY CARPENTER.

Witnesses:
WM. F. MCNAMARA,
ALEX. F. ROBERTS.